United States Patent Office 3,456,055
Patented July 15, 1969

3,456,055
MILDEW ERADICANT COMPOSITIONS
Arthur Lyle Galloway, Mentor, Ohio, assignor to Diamond Shamrock Corporation, Cleveland, Ohio, a corporation of Delaware
No Drawing. Filed Jan. 15, 1968, Ser. No. 697,644
Int. Cl. A01n 9/20
U.S. Cl. 424—304                    7 Claims

ABSTRACT OF THE DISCLOSURE

A synergistic combination of tetrachloroisophthalonitrile and 2,4-dinitro-6-(2-octyl)-phenyl crotonate and a method of preventing and eradicating powdery mildew by contacting said mildew with a preventive and eradicative amount of a synergistic combination of tetrachloroisophthalonitrile and 2,4-dinitro-6-(2-octyl)-phenyl crotonate.

Background of the invention

Field of the invention.—This invention relates to a synergistic combination of the compounds of tetrachloroisophthalonitrile and 2,4-dinitro-6-(2-octyl)-phenyl crotonate and in greater detail to a method of protecting against and eradicating powdery mildew, *Erysiphe polygoni*, by contacting foliage with an effective amount of a synergistic combination of tetrachloroisophthalonitrile and 2,4-dinitro-6-(2-octyl)-phenyl crotonate.

Description of the prior art.—Tetrachloroisophthalonitrile, sold under the trademark of Daconil 2787, is an effective fungicide possessing a broad spectrum of activity. Test data show tetrachloroisophthalonitrile to be effective against at least 115 economically important plant pathogens occurring on vegetables, agronomic crops, tree and small fruit crops, turf and ornamentals, and has also indicated effectiveness in certain seed and soil treatment applications. However, tetrachloroisophthalonitrile as the sole active ingredient in various pesticidal formulations has not proven to be a complete control against powdery mildew, *Erysiphe polygoni*, when tested as a protectant or an eradicant. It has remained desirable to discover additives for tetrachloroisophthalonitrile compositions which will initiate complete activity against powdery mildew.

2,4-dinitro-6-(2-octyl)-phenyl crotonate, sold under the trademark of Karathane, has been formulated into several possible parasiticidal compositions which have application as a toxic agent against mites as both a stomach poison and a contact poison and as fungicidal compositions effective on a broad spectrum of plant pathogens. However, application of 2,4-dinitro-6-(2-octyl)-phenyl crotonate as a sole active ingredient in various pesticidal formulations has not proven to be an effective control against powdery mildew, *Erysiphe polygoni*, when used as a protectant, or an eradicant, and at least 100 parts per million of crotonate are needed in order to make a reliable control against powdery mildew.

Summary of the invention

It has now been discovered that a combination of tetrachloroisophthalonitrile and 2,4-dinitro-6-(2-octyl)-phenyl crotonate in low dosages has surprisingly proven to provide effective control of powdery mildew, *Erysiphe polygoni*, when applied to the foilage of the plants as an eradicant or a protectant.

From the foregoing discussion, it is an object of this invention to formulate combinations of tetrachloroisophthalonitrile and 2,4-dinitro-6-(2-octyl)-phenyl crotonate effective in eradicating and protecting against powdery mildew.

It is a further object of this invention to lower the cost of using crotonates as eradicants or protectants for foilage against powdery mildew.

Other objects and applications of the novel combinations of the present invention will become apparent from the following specification, the identified examples and the appended claims.

Detailed description of the invention

The combinations of the present invention are compositions comprising a mixture of tetrachloroisophthalonitrile and 2,4-dinitro-6-(2-octyl)-phenyl crotonate in the ratio of 4 to 50:1, preferably 6 to 25:1 with or without other additives such as solid or liquid carriers, diluents or other pesticidally active ingredients. The compositions of the present invention present an effective method of completely eradicating or protecting against powdery mildew when brought into contact with the vegetation to be protected through spray or dust application.

Tetrachloroisophthalonitrile is a white crystalline solid of the structural formula

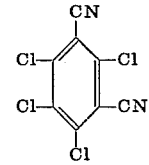

having empirical formula $C_8Cl_4N_2$ with a molecular weight of 265.9 and a melting range of 250° to 251° C. Tetrachloroisophthalonitrile may be prepared from the corresponding ring-chlorinated acid chlorides. A full discussion of the preparation and identification of tetrachloroisophthalonitrile may be gained by reference to U.S. Patent 3,290,353, and information of the reactivity of tetrachloroisophthalonitrile as a pesticidally active material may be gained from reference to U.S. Patent 3,331,735, both of which U.S. patents are hereby incorporated by reference.

2,4-dinitro-6-(2-octyl)-phenyl crotonate is the compound

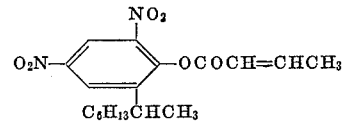

It may be prepared from capryl alcohol, octanol-2, and phenol through nitration and esterification. A full discussion of this crotonate compound, its preparation, and its application in parasiticidal compositions may be gained by reference to U.S. Patent 2,526,660 which is hereby incorporated by reference.

The formulations of the present invention can be made by mixing or tumbling appropriate proportions of 2,4-dinitro-6-(2-octyl)-phenyl crotonate and tetrachloroisophthalonitrile as a solid dust or powder where that is the desired form of the product or by putting the proper proportions of each chemical into a liquid carrier when it is to be utilized by liquid application.

In the practice of this invention, the compositions may be applied in admixture with either solid or liquid inert, pesticidal adjuvants. Thus, these compounds can be applied to the plants for fungicidal purposes, for example, by a dust or by spraying them in aqueous suspension.

Compositions of this invention can also be applied to plants and other materials along with inert solid fungicidal adjuvants or carriers such as talc, pyrophyllite, attapulgite, kieselguhr, chalk, diatomaceous earth, lime, kaolinite, calcium carbonate, bentonite, fuller's earth, cottonseed hulls, wheat flour, soybean flour, etc., pumice, tripoli, wood flour, walnut shell flour, and lignin.

It is frequently desirable to incorporate a surface active agent in the pesticidal compositions of this invention. Such surface active agents are advantageously employed in both the solid compositions and liquid dispersions. The surface active agent can be anionic, cationic, or nonionic in character. Typical classes of surface active agents include alkyl sulfonate, alkaryl sulfonates, alkyl sulfates, alkyl amide sulfonates, alkaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkyl phenyl ethylene oxides, e.g., p-isooctylphenol condensed with ten ethylene oxide units; and soaps, e.g., sodium stearate and sodium oleate. A typical surface active agent is aerosol OS (sodium salt of propylate naphthalene sulfonic acid).

Solid compositions and liquid dispersions can be prepared by suitable methods. Thus, the active ingredients in finely divided form as the solid, may be tumbled together with finely divided solid carrier. Alternatively, the reactive ingredients may be admixed with a solid carrier in finely divided form in amount small enough to preserve the free-flowing property of the final dust composition.

When solid compositions are employed, in order to obtain a high degree of coverage with a minimum dosage of the formulation, it is desirable that the formulation be in finely divided form. The dust containing active ingredients usually should be sufficiently fine so that preferably the average particle size is 2.5 microns maximum as determined by the Fisher Sub-Sieve sizer.

For dust purposes, preferably formulations are employed in which the active ingredients are present in an amount of 5 to 50 percent of the total by weight. However, concentrations outside this range are operative and compositions containing 1 to 99 percent of active ingredients by weight are contemplated, the remainder being carrier and/or any other additive or adjuvant material which may be desired. It is often advantageous to add small percentages of surface active agents, e.g., 0.5 to 1 percent of the total compositions by weight to dust formulations, such as the surface active agents previously set forth.

For spray application, the active ingredient may be dispersed in a liquid carrier, such as water or other suitable liquids. The active ingredient can be in the form of a suspension or dispersion in aqueous and nonaqueous medium. Desirably, 0.5 to 1.0 percent of the surface active ingredient by weight is included in the liquid composition.

For adjuvant purposes, any desired quantity of surface active agent may be employed, such as up to 250 percent of the active ingredient by weight. If the surface active agent is used only to impart wetting qualities, for example to the spray solution, as little as 0.05 percent by weight or less of the spray solution need be employed. The use of larger amounts of surface active agent is not based upon wetting properties but is a function of the physiological behavior of the surface active agent. In the liquid dispersions the active ingredient often constitutes not over 30 percent by weight of the total and may be 10 percent, or even as low as 0.01 percent.

It is also advantageous, in some instances, to employ other pesticidally active materials in combination with compositions of this invention. New compositions of this invention may, furthermore, be supplemented with other toxicants, such as rotenone, pyrethrum, dichlorodiphenyl trichloroethane, dithiocarbamates, and the like.

It is to be pointed out that the compositions of the instant invention have the desirable properties of controlling powdery mildew while retaining the excellent fungicidal properties exhibited by tetrachloroisophthalonitrile and the desirable activity against fungi and against the chewing and sucking insects exhibited by the 2,4-dinitro-6-(2-octyl)-phenyl crotonate and other additives. Therefore, this new composition has maintained not only the desirable properties of each of the individual constituents but has imparted further versatility to the use of these materials in enabling a new application in controlling powdery mildew. This will enable utilization of the compositions of the instant invention where more than one pesticidal activity is affecting the foliage to be protected. It is therefore obvious to those skilled in the art that these materials will have a multiplicity of useful applications.

In order that those skilled in the art may more completely understand the present invention and the preferred methods by which the same may be carried into effect, the following specific example is offered.

EXAMPLE

Bean mildew test.—To measure the foliage contact fungicidal activity of the composition of this invention against the powdery mildew, Erysiphe polygoni, a test formulation of 150 ml. is prepared for foliage spray treatments. Each test formulation contains the active ingredients in parts per million of the test compounds as indicated in the following table in addition to sufficient acetone, stock dispersion agent (0.5% Triton X-155 in water by volume), and distilled water. Garden bean plants, var. Tendergreen, about four to six inches tall, four per clay pot are treated. For eradicative tests, at least one day prior to treatment the plants are inoculated with powdery mildew, Erysiphe polygoni, from cultures maintained in the greenhouse, under environment where the spores are constantly available for disease initiation. For protective tests, the plants are exposed to cultures of powdery mildew, Erysiphe polygoni, from cultures maintained in the greenhouse on the same day as the spraying of the plants with the formulations described above.

TABLE A

| Tetrachloroiso-phthalonitrile (p.p.m.) | Eradicant activity against powdery mildew estimated percent control,[1] p.p.m., 2,4-dinitro-6-(2-octyl)-phenyl crotonate | | |
|---|---|---|---|
| | 8 | 4 | 0 |
| 200 | 95 | 70 | 20 |
| 100 | 90 | 40 | 0 |
| 50 | 90 | 0 | 0 |
| 0 | 20 | 0 | 0 |

[1] Based on duplicate pots each containing 4 bean plants. Data read 14 days after treatment.

TABLE B

| Tetrachloroiso-phthalonitrile (p.p.m.) | Protectant activity against powdery mildew, estimated percent control[1] p.p.m., 2,4-dinitro-6-(2-octyl)-phenyl crotonate | | |
|---|---|---|---|
| | 8 | 4 | 0 |
| 100 | 95 | 40 | 0 |
| 50 | 90 | 20 | 0 |
| 0 | 20 | 0 | 0 |

[1] Based on duplicate pots each containing 4 plants. Data read 14 days after treatment.

I claim:

1. A powdery mildew control composition comprising as the essential active ingredient a mildew controlling amount of a mixture of tetrachlorisophthalonitrile and 2,4-dinitro-6-(2-octyl)-phenyl crotonate in the ratio of 4 to 50:1, respectively.

2. The powdery mildew control composition of claim 1 wherein there is incorporated at least one other pesticidally active additive.

3. The powdery mildew control composition of claim 1 wherein there is incorporated an additive selected from the group consisting of inert carriers and surface active agents.

4. The powdery mildew control composition of claim 3 wherein there is incorporated at least one other pesticidally active additive.

5. A method of controlling powdery mildew comprising contacting vegetation with a mildew controlling an effective amount of a composition comprising a mixture of tetrachloroisophthalonitrile and 2,4-dinitrro-6-(2-octyl)-phenyl crotonate in the ratio of 4 to 50:1, respectively.

6. The method of claim 2 wherein vegetation infested with powdery mildew is treated with an eradicative amount of a composition comprising a mixture of tetrachloroisophthalonitrile and 2,4-dinitro-6-(2-octyl)-phenyl crotonate.

7. The method of claim 2 wherein vegetation is protected from powdery mildew with a protective amount of a composition comprising a mixture of tetrachloroisophthalonitrile and 2,4-dinitro-6-(2-octyl)-phenyl crotonate prior to exposure to powdery mildew infestation.

References Cited

UNITED STATES PATENTS 3,331,735   7/1967   Battershell et al. _____ 167—13

OTHER REFERENCES

Conover, Robert: "Chemical Abstracts," vol. 51, p. 17061 (1957).

FRANK CACCIAPAGLIA, Jr., Primary Examiner

V. D. TURNER, Assistant Examiner

U.S. Cl. X.R.

424—314

PO-1050
(5/69)

UNITED STATES PATENT OFFICE
CERTIFICATE OF CORRECTION

Patent No. 3,456,055  Dated July 15, 1969

Inventor(s) Arthur Lyle Galloway

It is certified that error appears in the above-identified patent and that said Letters Patent are hereby corrected as shown below:

In column 5, Claim 6, line 5, change "2" to -- 5 --.

In column 5, Claim 7, line 10, change "2" to -- 5 --.

In column 5, Claim 5, lines 1 and 2, the words "an effective" should be cancelled.

SIGNED AND
SEALED
MAR 17 1970

(SEAL)
Attest:

Edward M. Fletcher, Jr.
Attesting Officer

WILLIAM E. SCHUYLER, JR.
Commissioner of Patents